W. G. ABBOTT, Jr.
GAS LUBRICATED BEARING.
APPLICATION FILED MAY 4, 1916.
1,337,742.
Patented Apr. 20, 1920.
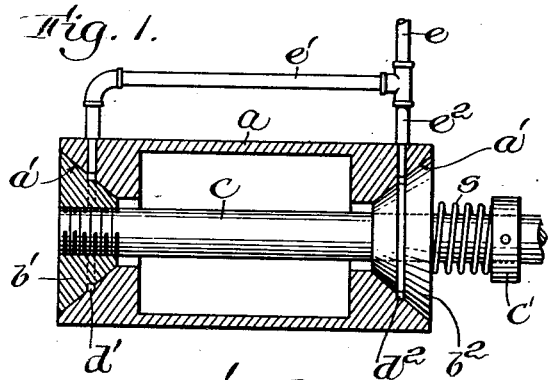
Fig. 1.
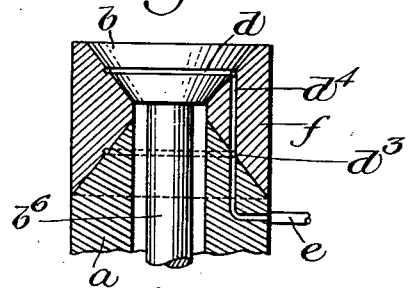
Fig. 2.
Fig. 3.
Fig. 5.
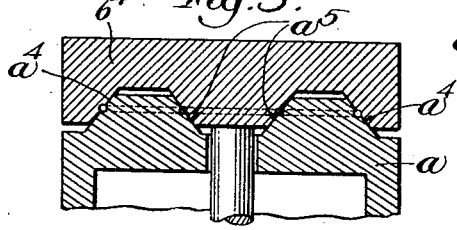
Fig. 4.
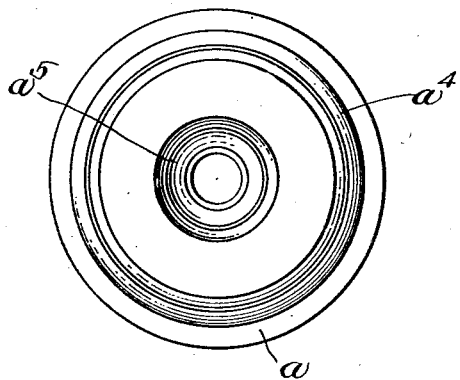
Inventor:
William G. Abbott, Jr.,
by Roberts, Roberts & Cushman
Attorneys.

UNITED STATES PATENT OFFICE.

WILLIAM GEORGE ABBOTT, JR., OF WILTON, NEW HAMPSHIRE.

GAS-LUBRICATED BEARING.

1,337,742.　　　　　Specification of Letters Patent.　　Patented Apr. 20, 1920.

Application filed May 4, 1916. Serial No. 95,466.

*To all whom it may concern:*

Be it known that I, WILLIAM G. ABBOTT, Jr., a citizen of the United States, and resident of Wilton, in the county of Hillsborough and State of New Hampshire, have invented new and useful Improvements in Gas-Lubricated Bearings, of which the following is a specification.

This invention relates to the lubrication of bearings by air, steam or vapor (which will hereinafter be referred to under the generic term gas) under pressure, and its object is to produce such gas bearing adapted to carry a greater load and to withstand a greater side thrust or side pressure than gas bearings heretofore used, comprising cylindrical bearing surfaces, or plane flat bearing surfaces.

I have discovered that complementary tapering bearing surfaces such as conical surfaces, spherical surfaces, or some similar form of bearing surfaces of which one member is concave and the other convex, between which a film of compressed gas is maintained, will withstand a much greater axial thrust or load and also a greater side pressure or side thrust than cylindrical and plane surfaces; also that with bearing surfaces of this description the greater the axial thrust the greater side pressure will the bearing withstand.

In the preferred form of my invention the bearing surfaces are complementary conical surfaces, and preferably the cone is a ninety degree cone, although it will be understood that my invention is not limited to such specific form of conical surface.

In the accompanying drawings which illustrate certain embodiments of the invention,—

Figure 1 is a sectional view, partly in elevation, of a bearing embodying the invention in which the axis of rotation is horizontally arranged;

Figs. 2, 3, and 5 are sectional views, partly in elevation, showing certain other forms of bearings embodying the invention, in which the axis of rotation is vertically arranged; and Fig. 4 is a plan view of the lower member shown in Fig. 3.

In Fig. 1, $a$ represents one of the two relatively movable elements, in this case the stationary element, and consists of a casing or bearing member formed with two opposed conical bearing surfaces $a'$, $a'$. Two complementary cone-shaped bearing members $b'$, $b^2$, are mounted on shaft $c$ and constitute the rotary element. The clearance between the bearing surfaces of the two complementary elements is very small and is just sufficient to admit a thin film of air or other gas which is introduced between the bearing surfaces from a source of gas supply under pressure through a conduit $e$ and branches $e'$, $e^2$, which communicate respectively with the grooves $d'$, $d^2$, formed in the bearing surfaces. The gas is forced by the pressure from the grooves into a thin film between the coacting bearing surfaces. The cone member $b^2$ may be fixed to the shaft $c$ and the clearance adjusted by means of a screw-thread connection between the cone member $b'$ and $c$; when properly adjusted and supplied with gas under pressure, the bearings will support a very substantial end or axial thrust and also a very substantial side pressure. Instead of fixing the cone member $b^2$ to the shaft $c$ it may be mounted to slide thereon and may be forced toward its seat by a spring $s$ between the cone member $b^2$ and a collar $c'$ fixed to the said shaft $c$. The spring pressure is overcome by the gas pressure admitted between the surfaces from the gas inlet $e$, and the two opposed pressures, gas and spring, will arrive at a point of equilibrium keeping the cones at a working distance from their opposing surfaces.

In the form shown in Fig. 2 an intermediate rotary member $f$ (or more than one such member if desired) having two oppositely disposed conical surfaces is arranged between the stationary element $a$ and the rotary element $b$. The conical surfaces between $b$ and $f$, and between $f$ and $a$ are supplied with gas lubrication from a suitable source of gas pressure through inlet $e$, which communicates with the groove or channel $d^3$ in the conical bearing surface between $a$ and $f$, and thence the gas is transmitted through a duct $d^4$ to the channel $d$ between the bearing surfaces of $b$ and $f$.

In Figs. 3 and 4 the stationary bearing element $a$ has two concentric conical bearing surfaces $a^4$ and $a^5$, and the rotary element $b^4$ has complementary and similar concentric conical bearing surfaces. Said bearing surfaces may be provided with grooves or channels as before, and gas under pressure is forced between said surfaces as in the other cases. Bearings of this form may be used in pairs, as in Fig. 1, and may be arranged to maintain disk-like members $b^4$ at a working distance.

In Fig. 5 $a$ represents the stationary member as before, and has two opposed conical bearing surfaces $a^6$ and $a^7$. The rotary member $b^8$ has a conical bearing surface $b^9$ fitting surface $a^6$, and another conical bearing surface $b^{10}$ on an annular member $b^{11}$, fits bearing surface $a^7$. The part $b^{11}$ is threaded on to the sleeve $b^{12}$ of member $b^8$, and brought to proper adjustment so as to leave a suitable very small clearance between the opposed bearing surfaces. Gas under pressure is introduced through inlet $e$ and branches $e^3$ and $e^4$ to channels $d^4$ and thence distributed between the bearing surfaces. The low friction of the bearings permits a large ring to be run at high speeds with little power. The pressure should be equalized between the opposed bearings by connecting passages $p$.

In any of the several forms of complementary tapering bearing surfaces I find that with gas lubrication admitted between the surfaces under a given pressure, a far greater resistance both to axial thrust and to side thrust will be attained than with cylindrical and plane gas bearing surfaces of the kind heretofore proposed.

I claim:

1. A fluid bearing comprising two relatively rotatable elements having two sets of complementary tapering bearing surfaces, the respective sets of surfaces tapering in opposite axial directions, and means for supplying gaseous fluid under pressure to points between each set of surfaces, whereby lateral pressure between the elements and relative end thrust in both directions will be pneumatically restrained.

2. A fluid bearing comprising two relatively rotatable elements having two sets of complemental tapering bearing surfaces, the respective sets of surfaces tapering in opposite axial directions, and means for supplying fluid under pressure to points between each set of surfaces, said means having a fluid supply duct communicating with both sets of surfaces.

3. A fluid bearing comprising two relatively rotatable elements having two sets of complemental tapering bearing surfaces, the respective sets of surfaces tapering in opposite axial directions, each of said sets of surfaces having opposing circumferential grooves disposed concentrically to the axis of relative rotation intermediate the ends of said surfaces, and a branched fluid supply duct communicating with each set of said grooves, each branch of said duct being of equal length so that fluid may be supplied to each set of grooves at the same pressure.

Signed by me at Wilton, New Hampshire, this twenty-seventh day of April 1916.

WILLIAM GEORGE ABBOTT, Jr

Witnesses:
JAMES H. WILCOCK,
EDGAR HOLMES.